United States Patent Office 3,287,244
Patented Nov. 22, 1966

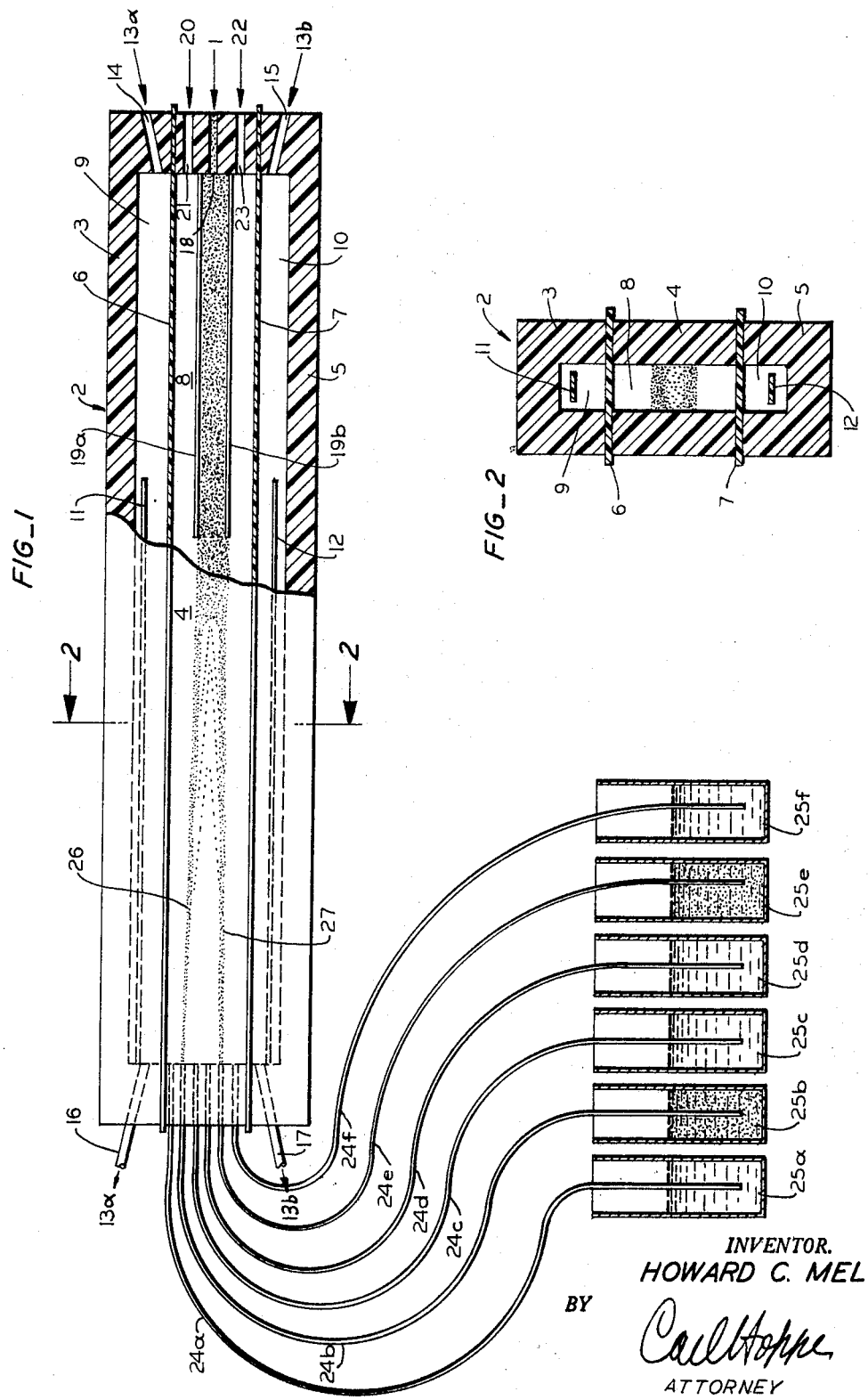

3,287,244
STABLE FLOW SEPARATION AND
ANALYTICAL METHOD
Howard C. Mel, 1400 Scenic Ave., Berkeley, Calif.
Filed Mar. 23, 1960, Ser. No. 17,017
6 Claims. (Cl. 204—180)

This invention relates generally to liquid separation and analytical methods and apparatus. More particularly it relates to separation, concentration and analytical methods and apparatus for defining and utilizing stable free boundaries within a flowing liquid system without the use of any stabilizing or supporting medium.

Although various efforts have been made to effect separations from a mixed stream of two or more components in a dispersing phase by the application of an electric field applied transversely to the stream, it has not been possible to achieve the necessary stable flow free boundary conditions to make possible complete separations over a wide variety of flow rates.

Therefore, the principal object of the present invention is to provide a method and a compact apparatus in which free boundary flow conditions are stabilized enabling continuous separations and concentrations to be made at a variety of flow rates.

Another object of the present invention is to provide a method and apparatus in which free boundary flow conditions are stabilized permitting instantaneous analytical measurements to be made on the flowing streams.

A further object of this invention is to provide a high capacity method and apparatus for continuous electrophoretic separation with high resolution of streams of dispersed components having differing mobilities, isoelectric points, complexing tendencies or the like.

Other objects and advantages of this invention will become apparent to those skilled in this art from a consideration of the following description, the accompanying drawing and the appended claims. A specific embodiment of apparatus used in performing the present method utilizing an electric force field is described herein and in the accompanying drawing.

It will be understood by those skilled in this art, however, that other fields applying a transverse force to the flowing stream may be used in place of or concurrently with the described electric field. Such force fields which cause selective migration of dispersed components include thermal, gravitational and magnetic force fields.

In practicing the method of the present invention the dispersements to be separated are caused to flow continuously in stable free boundary streams at laminar flow rates through the transverse force field, in the specific embodiment in the form of an electric field. One or more of the variables of the system and force fields such as flow rate; field polarity and strength; current density; and values and gradients of fluid concentration, conductivity, density, temperature and pH are adjusted so that one or more of the components selectively migrates into a separate strata or band and for separation or concentration purposes, is withdrawn in a purified state from the apparatus. This migration is a function of the properties of each particular component such as mobility, isoelectric point, diffusion coefficient or the like. Where concurrent force fields act transversely on the flowing streams, each strata or band can be subdivided and the subfractions separately withdrawn through additional segregated outlets.

The present invention and the particular embodiment described herein will be better understood with reference to the accompanying drawing, wherein:

FIG. 1 is a side elevational view of one form of electrophoresis apparatus for performing the present method shown partially in section; and FIG. 2 is a cross sectional view of the apparatus taken along line 2—2 of FIG. 1.

Referring to the apparatus of FIG. 1 the dispersements to be separated, referred to as stream 1, are supplied to an enclosed cell, designated generally as 2, and are separated into components which are withdrawn from the cell 2 through outlets at the exit end of the cell. The cell 2 is fabricated from clear inert material such as plastic sold commercially under the trade name "Lucite" and comprises a top section 3, a center section 4, and a bottom section 5 which is substantially identical to top section 3. The configuration of these three sections is more clearly illustrated in FIG. 2. The center section 4 is sandwiched between the top and bottom sections 3, 5 and normally is separated therefrom by semipermeable membranes 6 and 7, respectively. The membranes are well-known semipermeable dialyzing membranes such as those sold commercially under the trade name "Visking." The semipermeable membranes 6, 7 define a separation chamber 8 within the center section 4 and isolate the chamber from adjacent electrode chambers 9 and 10 formed longitudinally in the top and bottom sections 3, 5 respectively. The cell assembly is clamped together by suitable means familiar to those skilled in this art.

An electrode 11 is mounted within electrode chamber 9 and a corresponding electrode 12 is mounted opposite it in electrode chamber 10. The electrodes 11, 12, for example, are made from a thin platinum strip or from fine mesh platinum screen. The latter construction permits light to pass vertically through the electrodes to illuminate the separation chamber 8. A variable source of D.-C. potential, not illustrated in FIG. 1 is applied across electrodes 11, 12 to produce a transverse electric field across the separation chamber 8.

Electrolytic solutions 13a, 13b are introduced through inlet ports 14 and 15, respectively, to electrode chambers 9, 10. The electrolytic solutions may be circulated through the electrode chambers using outlet ports 16 and 17 or, if the products of electrolysis of the solutions are not undesirable, the solutions need not flow or be renewed. If the linear flow rates of the solutions 13a, 13b are made identical to the fluid flow rates through separation chamber 8, the semipermeable membranes 6, 7 need not be used in the described apparatus.

Stream 1 consisting of the solution or dispersions to be separated is admitted to the separation chamber 8 of the cell through inlet 18 and flows between a pair of parallel dividers 19a, 19b extending part of the length of the separation chamber which defines stream 1 in a band. These dividers are not absolutely necessary for inlet flow rates well within the laminar flow region but provide an improved performance at rates approaching the turbulent flow region for the particular dispersion. A spacer fluid 20 is admitted through inlet port 21 above stream 1 and a spacer fluid 22 is admitted to the separation chamber below stream 1 through inlet port 23. The spacer fluids 20, 22 and stream 1 are supplied at the same flow rate and exit from the cell through one or more of outlets 24a, 24b, 24c, 24d, 24e or 24f at the exit end of the separation chamber 8. Twelve outlets are normally provided to achieve finer resolution but for purposes of clarity only six outlets have been illustrated in the accompanying drawing. It will be apparent that different numbers of outlets will be useful for specific applications.

Normally without the electric field being applied, stream 1 will flow in a well-defined band and will exit from the cell uniformly through outlets 24c and 24d at the exit end of the cell into collection bottles 25c and 24d shown in FIG. 1. Spacer fluids 20, 22 form stable free boundaries with stream 1. The closed hydraulic system, as shown in FIG. 1 together with adjustment of the densities of the spacer fluid streams relative to stream 1 contribute to the stabilization of this flow configuration.

When the electric field is applied, depending on the relative mobilities or isoelectric points of the various components of stream 1, one or more components migrate transversely with respect to each other or to the balance of the stream and concentrate in a narrow strata or ribbon at the free boundaries of stream 1. The relative position and width of the concentrated strata of component may be controlled by selection of appropriate values for the conductivity, pH and density among the spacer fluid streams and stream 1 and by adjusting the field strength, flow rates through the apparatus or the relative elevation of parts of the apparatus. Establishment of the conductivity of stream 1 at a value substantially lower than that of the adjacent spacer fluids, as is well-known in this art, causes the components to migrate to and concentrate at the appropriate free boundary formed by the spacer fluids and stream 1. Hence the free boundaries act as "conductivity barriers" for the migrating components. (The discontinuities in migration rates follow from discontinuities in field strength which result from the above mentioned conductivity differences between the streams.) For example, the apparatus of FIG. 1 illustrates the separation of two dyes uniformly suspended in a dispersing phase, one of which migrates toward electrode 11, concentrates in a narrow strata or ribbon 26 at the upper boundary of stream 1, and passes from the cell through outlet 24b. The other dye migrates toward the lower electrode 12, concentrates in ribbon 27 at the lower free boundary, and passes from the cell through outlet 24e.

Each outlet 24a, b, c, d, e and f is connected by flexible tubing to a separate collection bottle 25a, b, c, d, e and f, respectively, of uniform size and shape and the entire apparatus is thus hydrodynamically unified. The liquid level in all collection bottles is initially at the same elevation. During operation of the apparatus the collection bottles fill regularly and the various ribbons of fluid in the separation chamber 8 maintain their relative position as a consequence of this hydrodynamic balance.

Motor driven syringes have been found to be satisfactory pumping means to provide a uniform flow of fluids to the cell. Other pumping means well-known to the art may also be used. The rate of flow of stream 1 and the spacer fluids preferably is identical so as to aid in maintaining stable flow streams and free boundaries between the different fluids within the cell. However, the present method is operable in many instances with different flow rates among stream 1 and the spacer fluids.

This mode of operation with discontinuities in migration rates at "conductivity barriers" is not restricted to applications using electrical fields and electrical conductivity, but is also applicable for other force fields and transport processes.

Another type of multi-component separation takes advantage of differing mobilities of dispersed components causing migration of these components to different positions in solution (and subsequent separation at the outlets) without any discontinuities in migration rates at "conductivity barrier" free boundaries. Thus, the well-known Tiselius type or density gradient type of vertical non-flow electrophoretic method in a medium of uniform conductivity may be combined with the stable horizontally flowing fluid system of the present invention.

Another mode of operation, particularly useful for multi-component separations, results when migration rates change continuously during the migration, for example, when the rates decrease until they become zero and the resultant forces acting on each component are zero, causing stabilization of the components at such positions in solution. An example of this is the sedimentation or flotation of components subjected to gravitational forces (natural or artificial) in a density gradient until they reach their equilibrium positions. Another well known example is that of pH gradient-isoelectric point type separations of ampholytes. Choice of the proper field polarity and pH range relative to the isoelectric points of the various components induce each of said components to migrate to and concentrate at whatever liquid strata in the separation chamber is established at a pH identical to that of the isoelectric point for the particular component.

For a number of the foregoing type of separations and modes of operation, additional inlets in the apparatus are useful and are provided to establish and maintain reproducible and finely controlled gradients of pH, density or the like. It should be understood that the migration principles inherent in the above described modes of operation may be used during a single experiment in a variety of combinations as described in UCRL 9108, February 26, 1960, published by the Lawrence Radiation Laboratory, University of California, Berkeley, California.

The following examples are presented to further illustrate the method of the present invention as practiced in an apparatus of the type shown in FIGS. 1 and 2 in some instances provided with additional inlets and outlets:

*Example 1.—Flow stability without force field*

Apparatus of the type illustrated in FIG. 1 was used having twelve inlets and twelve outlets to separation chamber 8 designated herein as 1 through 12 from top to bottom. Dividers 19a, 19b were removed providing approximately 12 cm. of free boundary. The distance between electrodes 11, 12 was approximately 5 cm. and the separation chamber 8 was approximately 3 cm. high and 0.7 cm. wide. Electrolytic solution 13a and a spacer fluid 20 were standard pH 4.0 phthalate buffer (Braun-Knecht-Heimann Co.) diluted fifty-fold to ionic strength of approximately 0.001. Spacer fluid was admitted to separation chamber 8 through inlet ports designated 1–4. Electrolytic solution 13b and spacer fluid 22 were standard pH 7.0 phosphate buffer (Braun-Knecht-Heimann Co.) diluted fifty-fold to ionic strength of approximately .002 and 2% by weight in sucrose. Spacer fluid 22 was admitted to separation chamber 8 through inlets designated 9–12. Additional aqueous solutions replacing stream 1 of FIG. 1 were introduced through inlets 5–8 being, respectively, 0.4%, 0.6%, 0.8% and 1% by weight in sucrose. In addition the solution introduced to inlet 5 contained .002% by weight cresyl violet dye (Allied Chemical and Dye), and .001% bromphenol blue dye (Coleman and Bell) was included in the solution supplied to inlet 7. Flow rate at 0.68 cc./minute/inlet or a total of 8.2 cc./minute was maintained. Spectrophotometric analysis was made on each of twelve collection bottles corresponding to 25a–25f of FIG. 1 over a wavelength range of 650–350 millimicrons.

The cresyl violet emanated from separation chamber 8, 80% through outlet 5 and 20% from outlet 6 and the bromphenol blue emanated 81% from outlet 7 and 19% from outlet 8. The stability of flow of the various streams was demonstrated by this nearly perfect symmetry of collection of the twelve outlet streams with no mixing or overlap. By adjustment of apparatus level or the flow rates of the exiting streams each of the foregoing dye streams can be made to exit substantially completely from a single outlet if desired. A steady-state flow pattern in an apparatus of this type having a 30 cm. free boundary flow is illustrated in UCRL 9108, February 26, 1960, published by the Lawrence Radiation Laboratory, University of California, Berkeley, California.

*Example II.—Separation of small molecules with force field applied*

The apparatus illustrated in FIG. 1 with inlets 18, 21, 23 was used having twelve outlets from the separation chamber 8 designated 1–12 from top to bottom and having approximately 10 cm. of free boundary subject to the electric field. Electrode spacing and the dimensions of separation chamber 8 were the same as those of Example I. Electrolytic solution 13a and spacer fluid 20 were an aqueous .006% by weight sodium chloride solution. Electrolytic solution 13b and spacer fluid 22 were an aqueous .006% sodium chloride solution, 2% by weight in sucrose. Stream 1 was an aqueous 1% sucrose solution containing .001% cresyl violet and .001% bromphenol blue. Flow rate of stream 1 was 1.3 cc./minute. A twenty volt potential was applied across the electrodes with electrode 11 positive.

During a 27 minute collection period the amounts of fluid collected in each bottle (i.e. the levels in the bottles of uniform dimension) increased uniformly and remained the same at all times, with the cresyl violet dye and the bromphenol blue appearing in separate collection bottles as is more fully described in "New Method of Continuous Free Boundary Electrophoresis" by Howard C. Mel appearing in the Journal of Chemical Physics, vol. 31, No. 2, 559–560, August 1959. This completeness of separation was confirmed by spectrophotometric analysis in the visible range.

*Example III.—Migration and concentration of large (protein) molecules with preservation of enzymatic activity*

Apparatus, electrolytic solutions and spacer fluids were the same as described in Example II with electrolytic solutions 13a and 13b adjusted to pH 6.9 and 6.0, respectively, by addition of minimum quantity of standard phosphate buffer. Sample stream 1 was .001% lysozyme solution (Worthington) at a pH of 6.33. A 30 volt electrode potential was applied with electrode 11 negative. Sample stream 1 flow rate was at 1.2 cc./minute. Lysozyme assay was made by the standard biological-optical method.

Migration of this protein occurred with the lysozyme leaving the separation chamber 8 almost entirely through outlet 4. Total recovery of enzymatic activity was greater than or equal to 95% and lysozyme concentration in the collection bottle for outlet 4 relative to its concentration in inlet stream 1 was 3.3 times greater.

*Example IV.—Separation of proteins with and without complexing*

Apparatus as described in connection with Example I having twelve inlets and twelve outlets and similar electrolytic solutions, spacer fluids, and aqueous solutions were used. Sample was admitted through inlet 7 at a flow rate of 0.5 cc./minute/inlet or 6.0 cc./minute overall. Electrode potential of 35 volts was applied with electrode 11 negative. Spectrophotometric analysis was made on each of the twelve collected fractions over a 600–200 millimicron wave length range. The sample contained in addition to 0.8% sucrose, .004% ± bovine hemoglobin (Worthington—spectrum indicated the iron to be in the ferric form) and .02% ± bovine gamma globulin (Fraction II, Nutritional Biochemical).

The gamma globulin exited through outlet 9 while the hemoglobin exited 93% through outlets 4 and 5 and 7% through outlet 6. None of the hemoglobin exited with the gamma globulin through outlet 9. Hemoglobin distribution in the collection bottles was based on the proportionate distribution of its optical density in the visible region.

Subsitution of human serum albumin (Nutritional Biochemical) .02% ± for the foregoing bovine gamma globulin results in the albumin also leaving separation chamber 8 through outlet 9. However, the hemoglobin in this case exited 73% through outlets 4 and 5, 7% through outlet 6 and 20% through outlet 9 along with the albumin. While the hemoglobin was largely separated from the serum protein, some hemoglobin remained associated with the albumin. This was not so with gamma globulin. Separate runs using hemoglobin alone or one of the foregoing serums alone produced all the hemoglobin through outlets 4 and 5 or substantially all the serum proteins through outlet 9. (Some of the serum proteins may also exit through outlets 8 or 10.) Moreover, a test of the foregoing hemoglobin-albumin mixture with the electric field polarity reversed, producing reversed directions of migration and isoelectric point stabilization of the separated components, confirmed the migration of about 20% of the hemoglobin with the albumin. These observations along with the spectral shape changes and consideration of the pH profiles of the solutions indicated a molecular interaction for hemoglobin with albumin, but not with gamma globulin.

It will be apparent therefore that the present method is useful for effecting rapid continuous separations of protein mixtures while at the same time preserving the interactions between components of the mixtures to enable their study. Weak interactions can survive, using the present method whereas with other means of handling involving contact with solid surfaces or the like, they may not. The ability to make complete separations of non-interacting components of a dispersed mixture permits interaction studies to be made which otherwise would be precluded by contamination from non-interacting components.

*Example V.—Cellular migrations and fractionations*

Using the apparatus described in Example II having twelve outlets, a sample stream 1 comprised of a suspension of starved Fleischmann yeast (about $10^5$ cells per cc.) and .001% cresyl violet dye at pH of 5.77 was admitted through inlet 18. Electrolytic solutions 13a and 13b were adjusted to a pH of 5.5 and 6.0 respectively, with minimum added quantities of pH 4.0 phthalate and pH 7.0 phosphate buffers, respectively. Electrode potential of 30 volts was applied with the electrode 11 positive. The sample flow was at 1.2 cc./minute. Analysis by hemocytometer counts and optical density measurements in the visible region were made. The yeast cells were found to move upward against gravity and left the separation chamber 8 principally through outlets 4–8 whereas the lighter dye concentrated largely in the lower outlets 9–10 as indicated in the table below.

| Collection Bottles | Yeast, Percent | Cresyl Violet, Percent |
| --- | --- | --- |
| 1–3 | 4 | |
| 4–8 | 88 | 16 |
| 9–10 | 5 | 84 |
| 11–12 | 3 | |

A similar fractionation of yeast cells (about $10^6$ cells/cc.) from bacteria of water is more fully discussed in UCRL 9108, February 26, 1960 to which reference has been made herein.

In addition to the type of interaction study indicated in Example IV, the present method permits rapid mixing and subsequent unmixing of dispersed components within controlled periods of time. It will be apparent that by suitable choice of conditions including force field, two or more separate flowing streams can be made first to migrate toward each other and then to "cross over" each other with mixing and unmixing occurring only during a specific time interval, for example, within seconds or even less. If an interaction or reaction occurs during this mixing time interval, a reaction product or products as well as the unreacted components can be made to appear in separate streams at the outlets of the separation chamber 8. In this manner studies can be made of interactions or reactions during specified time segments of a particular reaction. The multicomponent resolution of the components of such a reaction mixture are more fully described in UCRL 9108, February 26, 1960 published by the Lawrence Radiation Laboratory, University of California, Berkeley, California.

From an analytical standpoint, with reference to FIG. 1, positions downstream, along a stably flowing free boundary, for example, between sample steam 1 and adjoining spacer fluid 20, correspond to fixed positions in a nonflow system at successively later times after formation of a new free boundary. Thus a single photograph of such a flowing free boundary indicating the concentrations of a given component or components at each point in the dispersing phase is equivalent to a time sequence of photographs of a boundary in a nonflowing system. This permits a measurement of time-dependent transport properties in a dispersing phase at a particular instant of time. If no force field other than the normal force of gravity, is applied, diffusion coefficients are determinable, while in the presence of an electric field, e.g. electrophoretic mobilities are measurable.

It will be apparent to those skilled in this art that the foregoing methods and apparatus are useful for successfully making rapid separations of labile components. However, the present invention is also useful for slow flow or non-flow batch operation utilizing the stable flow characteristics only as a means for removing the segregated components.

Various modifications of the foregoing apparatus will become apparent to those skilled in this art such as increasing the separation chamber width to obtain larger capacity; increasing the number of inlet or outlet ports to permit additional streams of material to be separated simultaneously or to provide finer density, pH or conductivity gradients across the cell; additional spacer fluids may be employed or the method may be practiced without any spacer fluid being used. Moreover, separation may be practiced with a plurality of cells of the type described herein arranged in series or in parallel combinations to obtain more flexibility of operation. The foregoing specific embodiment is presented for clarity of understanding only and no unnecessary limitations should be understood therefrom for the invention is defined in the appended claims.

I claim:
1. A method for separating the components of a dispersion of charged components within an elongated separation chamber by electrophoresis, including introducing into one end of said chamber a continuous horizontal stream of strata under forced laminar flow conditions having increasing density from top to bottom and having different electrical conductivities; introducing said dispersion to said stream intermediate said strata and concurrently with its direction of flow within said chamber; applying an electric field vertically across said stream to form segregated bands of said charged components within said stream in accordance with their electrophoretic mobilities; isolating said stream from means applying said field by semipermeable membranes; and removing said bands of components from said chamber without intermingling.

2. A method of continuously separating within an elongated separation chamber at least one dispersed component from a liquid dispersing phase carrying said component consisting of introducing said component in its liquid dispersing phase into one end of said chamber in a continuous stream at a laminar flow rate;
exposing said stream to a force field means acting transversely on the stream with respect to the direction of flow of the stream through the chamber;
isolating said stream from said force field means within the chamber by semipermeable membrane means;
introducing at said laminar flow rate into said chamber between said stream and said membrane means and in contact with said stream at least one spacer fluid differing from said dispersing phase in a physical property to establish a stable free boundary with said dispersing phase;
said force field causing said component to migrate in accord with its mobility in said force field transversely with respect to said stream and to form a segregated band at said stable free boundary;
and separately withdrawing said spacer fluid, the component collected at said boundary and the remnant of said stream from said chamber.

3. The method according to claim 2 wherein a plurality of spacer fluids each differing from another in at least one physical property are introduced into the chamber;
and a stream carrying plural dispersed components is introduced intermediate certain of said spacer fluids, said spacer fluids establishing a plurality of stable free boundaries for the collection of said components each at a different one of said boundaries.

4. The method according to claim 2 wherein the separated dispersing phase, spacer fluid and component are collected in separate collection reservoirs maintained at balanced liquid levels.

5. A method of continuously separating within an elongated separation chamber at least one dispersed component from a liquid dispersing phase carrying said component consisting of introducing said component in its liquid dispersing phase into one end of said chamber in a continuous stream at a laminar flow rate;
exposing said stream to a force field acting transversely on the stream with respect to the direction of flow of the stream through the chamber;
introducing at said laminar flow rate into said chamber in contact with said stream at least one spacer fluid differing from said dispersing phase in a physical property to establish a stable free boundary with said dispersing phase;
said force field causing said component to migrate in accord with its mobility in said force field transversely with respect to said stream and to form a segregated band at said stable free boundary;
and separately withdrawing said spacer fluid, the component collected at said free boundary and the remnant of said stream from said chamber.

6. A method for continuously separating within an elongated separation chamber at least one dispersed component from a liquid dispersing phase carrying said component consisting of continuously introducing into one end of said chamber a plurality of contiguous spacer fluids each flowing at the same flow rate, said rate being any laminar flow rate;
separately withdrawing through segregated outlets at the other end of said chamber each of said spacer fluids and separately conducting the outflow to separate collection reservoirs maintained at balanced liquid levels;
introducing said dispersed component in its liquid dispersing phase in a continuous stream at said flow rate intermediate certain of said spacer fluids;
exposing said stream to a force field acting transversely with respect to the direction of the flow of said stream;
said force field causing said component to migrate transversely of said stream in accord with its mobility in said force field and to collect in a segregated band;
and separately withdrawing said component collected in said band and the remnant of said stream from the chamber.

References Cited by the Examiner

UNITED STATES PATENTS

| | | | |
|---|---|---|---|
| 2,073,952 | 3/1937 | Shepherd | 204—180 |
| 2,853,448 | 9/1958 | Heiskell | 204—299 |
| 2,878,178 | 3/1959 | Bier | 204—180 |
| 3,149,060 | 9/1964 | Dobry et al. | 204—301 X |

(Other references on following page)

FOREIGN PATENTS 334,120   3/1921   Germany.

OTHER REFERENCES

Dobry et al.: "Engineering Problems in Large-Scale Electrophoresis," Chemical Engineering Progress, vol. 54, No. 4, April 1958, pp. 59–63.

Stamburger: "The Method of Purifying and Concentrating Colloidal Dispersions by Electrodecantation," Symposium on the Research Tools of the Colloid Chemist, September 6, 1943, Pittsburgh, Pa.

Philpot, J.: "The Use of Thin Layers in Electrophoretic Separation," Transactions of the Faraday Society, vol. 36, 1940, pp. 38–46.

WINSTON A. DOUGLAS, *Primary Examiner.*

JOHN R. SPECK, JOSEPH REBOLD, JOHN H. MACK,
*Examiners.*

P. SULLIVAN, R. GOOCH, A. B. CURTIS,
*Assistant Examiners.*